United States Patent
Carrero et al.

(10) Patent No.: US 7,742,753 B2
(45) Date of Patent: Jun. 22, 2010

(54) METHOD AND APPARATUS FOR OPERATING A MOBILE COMMUNICATION DEVICE COUPLED WITH AN EXTERNAL POWER SUPPLY FOR CHARGING A BATTERY OF THE MOBILE COMMUNICATION DEVICE

(75) Inventors: Alfredo R. Carrero, Boynton Beach, FL (US); Wayne W. Ballantyne, Coconut Creek, FL (US); Joseph Patino, Pembroke Pines, FL (US); Scott A. Tassi, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 957 days.

(21) Appl. No.: 11/320,352

(22) Filed: Dec. 28, 2005

(65) Prior Publication Data

US 2007/0149254 A1    Jun. 28, 2007

(51) Int. Cl.
H04B 1/16 (2006.01)

(52) U.S. Cl. .............. 455/343.5; 455/127.1; 455/127.5; 455/13.4; 455/522; 370/335; 340/825.44

(58) Field of Classification Search .............. 455/343.5, 455/127.1, 127.5, 13.4, 522, 574, 298, 299, 455/431; 370/335, 342; 340/825.44
See application file for complete search history.

(56) References Cited

U.S. PATENT DOCUMENTS

| | | | | |
|---|---|---|---|---|
| 3,670,652 A * | 6/1972 | Ziemba | ...... | 102/214 |
| 3,748,367 A * | 7/1973 | Lamme et al. | ...... | 84/679 |
| 4,083,037 A * | 4/1978 | Larsen | ...... | 340/629 |
| 4,287,516 A * | 9/1981 | Coleman | ...... | 340/629 |
| 4,292,620 A * | 9/1981 | Pagane | ...... | 180/287 |
| 4,337,529 A * | 6/1982 | Morokawa | ...... | 377/20 |
| 4,463,759 A * | 8/1984 | Garito et al. | ...... | 606/42 |
| 4,839,645 A * | 6/1989 | Lill | ...... | 340/870.17 |
| 4,896,122 A * | 1/1990 | Tahernia et al. | ...... | 331/158 |
| 5,730,594 A * | 3/1998 | Sharp | ...... | 433/119 |
| 5,841,808 A * | 11/1998 | Rizzo et al. | ...... | 375/150 |
| 6,100,670 A * | 8/2000 | Levesque | ...... | 320/150 |
| 6,118,384 A * | 9/2000 | Sheldon et al. | ...... | 340/636.15 |
| 6,125,139 A * | 9/2000 | Hendrickson et al. | ...... | 375/220 |
| 6,271,714 B1 * | 8/2001 | Shin | ...... | 327/535 |
| 6,307,480 B1 * | 10/2001 | Sheldon et al. | ...... | 340/636.1 |
| 6,320,969 B1 * | 11/2001 | Killion | ...... | 381/323 |
| 6,337,913 B1 * | 1/2002 | Chang | ...... | 381/14 |
| 6,429,779 B1 * | 8/2002 | Petrillo et al. | ...... | 340/644 |
| 6,453,051 B1 * | 9/2002 | Killion | ...... | 381/315 |
| 6,486,727 B1 * | 11/2002 | Kwong | ...... | 327/534 |
| 6,487,670 B1 * | 11/2002 | Racino et al. | ...... | 713/340 |
| 6,633,203 B1 * | 10/2003 | Joe | ...... | 331/173 |
| 6,652,330 B1 | 11/2003 | Wasilewski | | |
| 7,092,265 B2 * | 8/2006 | Kernahan | ...... | 363/65 |

(Continued)

*Primary Examiner*—Minh D Dao

(57) ABSTRACT

A mobile communication device 100 has a digital subsystem (110) and a radio frequency subsystem (108), and is powered by a battery (102) which is charged via a charge control circuit (106) using an external power supply (104) connected to the mobile communication device in a single path configuration. The mobile communication device permits limited operation of the mobile communication device by a user while the battery voltage is sufficient to power the digital subsystem but not yet sufficient to power the radio frequency subsystem. The delay in operation is minimized, however, because once charging commences, the battery voltage rises sufficiently fast that, typically, by the time the digital subsystem is initialized, enabled, and powered up, the battery voltage will be sufficient to enable the radio frequency subsystem.

15 Claims, 4 Drawing Sheets

U.S. PATENT DOCUMENTS

| | | | |
|---|---|---|---|
| 7,324,787 B2* | 1/2008 | Kurakami et al. | 455/69 |
| 2001/0043194 A1* | 11/2001 | Amron | 345/169 |
| 2002/0080924 A1* | 6/2002 | Petrillo et al. | 379/27.07 |
| 2007/0018723 A1* | 1/2007 | Arbab et al. | 330/151 |
| 2007/0036017 A1* | 2/2007 | Seo | 365/222 |
| 2007/0279366 A1* | 12/2007 | Kageyama et al. | 345/100 |

* cited by examiner

100

300

METHOD AND APPARATUS FOR OPERATING A MOBILE COMMUNICATION DEVICE COUPLED WITH AN EXTERNAL POWER SUPPLY FOR CHARGING A BATTERY OF THE MOBILE COMMUNICATION DEVICE

TECHNICAL FIELD

This invention relates in general to mobile communication devices, and more particularly to operation of the mobile communication device when coupled to an external power supply for charging a battery of the mobile communication device, and where the mobile communication device is configured with a single path charging scheme for simultaneously charging the battery and providing power to the mobile communication device.

BACKGROUND OF THE INVENTION

Mobile communication devices are in widespread use throughout the world, and in particular in metropolitan regions of the world. These devices are typically powered by a rechargeable battery to avoid the expense of frequently replacing battery cells. The rechargeable battery is typically disposed in a battery compartment of the mobile communication device, and covered by section of the housing referred to as a battery cover. To recharge the battery, the mobile communication device is connected to an external power supply and charging circuitry inside the mobile communication device controls charging of the battery. There are two different charger arrangements, commonly referred to as single and dual path charging.

A single path charging arrangement powers the mobile communication device from the battery voltage during charging, while the dual path charging arrangement powers the mobile communication device from the external power source at least initially, until the battery voltage rises sufficiently to power the mobile communication device. In some dual path charging arrangements the mobile communication device may always be powered by the external power source while the mobile communication device is connected to the external power source. At the same time, the battery is charged via a second path. The advantage of dual path charging is that immediately upon connecting the mobile communication device to the external power supply the user may use the mobile communication device, regardless of the battery state of charge. This has not been possible in a single path charging arrangement when the battery is substantially discharged because the battery voltage must first rise to a level capable of powering all systems of the mobile communication device. This causes an annoying delay for the user, and also limited user feedback as the communication device cannot power up and give a display message showing charging status or other information. The single path scheme uses fewer components, and is less expensive to implement. It also avoids the complexities of precise supply switching required in dual path when the external power supply is attached or removed. Therefore there is a need a charging circuit scheme that allows operation of the mobile communication device while the battery voltage is low, but without the expense of a dual path scheme.

DETAILED DESCRIPTION

Figure 1:
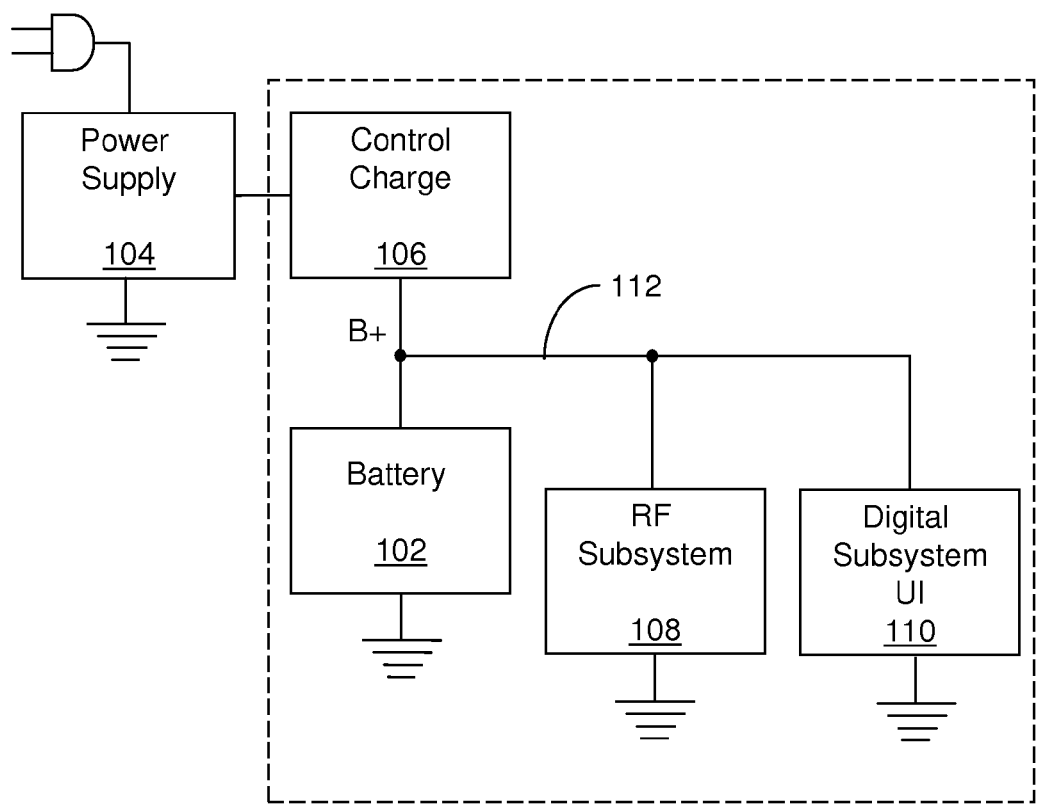
FIG. 1 shows a block schematic diagram of a mobile communication device, in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward. The invention solves the problem of single path charging requiring sufficient voltage to power all portions of the mobile communication device before allowing a user to power up the phone by taking advantage of the differing voltage requirements of the various portions of the mobile communication device. Furthermore, the invention allows a dual supply scheme for an oscillator used to provide a clock signal to the mobile communication device. A first voltage level is applied to the oscillator to produce nominal performance. As the battery voltage rises, a second voltage level is applied to the oscillator for enhanced performance.

Referring now to FIG. 1, there is shown a block schematic diagram 100 of a mobile communication device, in accordance with an embodiment of the invention. The mobile communication device contains a rechargeable battery or battery cell 102. A number of battery types may be used, including nickel metal hydride, lithium ion, and nickel cadmium, for example. The battery 102 is charged once the mobile communication device is connected to an external power source 104, such as an AC to DC converter. The power from the external power source is controlled by a charge control circuit 106. The charge controller, among other things, monitors the voltage and controls the current applied to the battery 102 in accordance with charge regime. The battery provides a battery voltage on line 112 which is provided to a radio frequency subsystem 108 and a digital subsystem 110, which may include a microprocessor and associated memory. The radio frequency subsystem includes radio components for receiving and transmitting radio signals. The digital subsystem controls other operations of the mobile communication device, including a user interface, such as a graphical display, keypad and buttons, and audio transducers such as an earpiece speaker and a microphone. Note that the radio and digital subsystems are both powered from the battery voltage, or B+, line, which is characteristic of the single path scheme. According to the invention, and assuming an initially depleted battery, as the battery voltage rises, the digital subsystem may be turned on first, at a lower voltage, allowing the user to operate certain functions of the mobile communication device, but not the radio system. Subsequently, as the battery voltage continues rising to a level sufficient to power the radio frequency subsystem, the radio frequency subsystem is then initialized for use, if needed.

Figure 2:
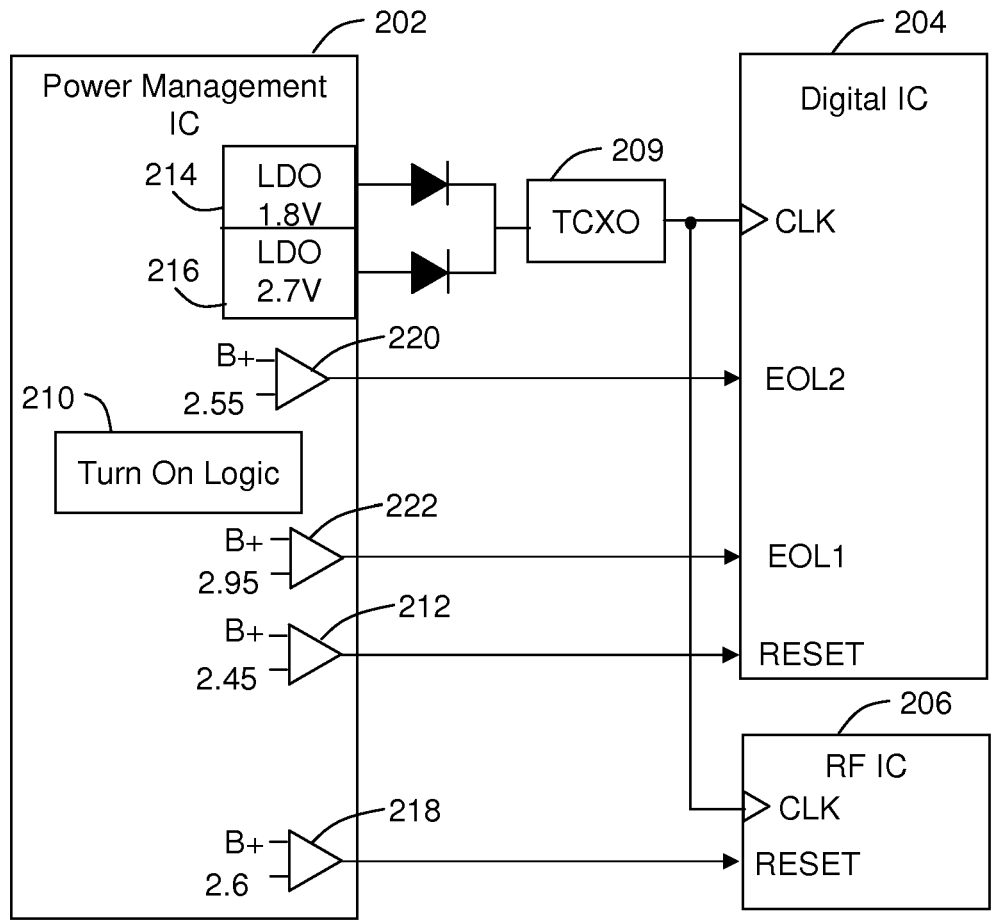
FIG. 2 shows a power management schematic diagram of a mobile communication device, in accordance with an embodiment of the invention.

Referring now to FIG. 2, there is shown a power management schematic diagram 200 of a mobile communication device, in accordance with an embodiment of the invention. The mobile communication device includes a power management controller or integrated circuit (IC) 202 which contains various circuits for enabling and disabling subsystems of the mobile communication device as the battery voltage changes. According to the present embodiment, the power management IC specifically controls operation of a digital IC 204 and radio frequency IC 206. Each of these may be viewed equivalently as the digital and radio frequency subsystems, respectively. Furthermore, the mobile communication device comprises an oscillator 208, which may be, for example, a temperature compensated crystal oscillator. The oscillator is operable over a wide range of applied voltage, but the quality of the oscillator output signal for aspects of oscillator performance such as phase noise may improve with increased applied voltage. The power management IC contains turn on logic 210 that control the powering up of various portions of the mobile communication device. To ensure the battery voltage is sufficiently high to allow operation, the battery voltage must be above a lower or first level, such as, for example, 2.45 volts. If the battery voltage is below the first level, the turn on logic will not commence power up of subsystems of the mobile communication device, and will simply wait for the battery voltage to rise sufficiently as the battery is charged. Once the battery voltage rises above the first level, the turn on logic will commence initializing the digital IC 204, such as by a first comparator 212. The first comparator compares the battery voltage to a reference voltage equal to the threshold level required for initializing the digital IC via a reset input of the digital IC. The power management IC may also turn on a first voltage regulator 214 which provides a first regulated voltage level to the oscillator 208, which in turn provides the necessary clock signal to the digital IC. It will be appreciated by those skilled in the art that a variety of clock oscillator configurations may be used without departing from embodiments of the invention. The digital IC may operate at a nominal voltage as low as, for example, 1.8 volts. However, it is preferred to simply charge the battery while the battery voltage is below an initialization voltage of, for example, 2.45 volts, according to one embodiment of the invention. The initialization voltage allows the digital IC to, for example switch from an internal clock source to the external clock provided by the oscillator, which may also be used to provide a clock signal to peripheral components of the digital IC such as memory modules, display drivers, and so on.

Once the digital IC is enabled upon the battery voltage reaching a digital enabling level, the digital IC may be powered up, if a user of the mobile communication device decides to operate the mobile communication device. The digital IC supports operation of a user interface, which allows the user to interact with, and control, the mobile communication device. The user interface may include, for example, a graphical display and driver, audio elements such as a speaker and microphone, and a keypad and other buttons, as is known. Once the digital IC is enabled, the power control IC can adjust the current from the external power supply to continue charging the battery at a preferred rate as well as power the portions of the phone drawing power.

As the battery continues to charge, the battery voltage correspondingly rises, the battery voltage reaches a nominal RF initialization level of, for example, 2.95 volts, as indicated by comparator 218. To prepare for the enablement of the radio frequency IC, the power management IC switches the oscillator to a second regulated voltage level via a second voltage regulator 216 that is higher than the first regulated voltage level to provide better oscillator performance. The two oscillator voltage regulators are coupled to the oscillator via a pair of diodes to allow seamless switching of the regulated voltage level applied to the oscillator. It will be realized by those skilled in the art that the digital IC and radio frequency IC may be initialized at voltage level below their optimum operating levels. By initializing the IC it is mean that support components of the IC are powered up so that by the time the voltage rises to an operating or enabling level, the IC is ready to perform. In one embodiment of the invention the digital IC may be initialized at 2.45 volts and enabled at 2.65 volts, while the RF IC is initialized at about 2.6 volts but not enabled until the battery voltage is 3.3 volts. Initialization may occur by operation of comparators, while enablement of the ICs may occur by software operation of the controller.

The power management IC further comprises end of life (EOL) comparators 220, 222. The EOL comparators indicate when the voltage of the battery has dropped below a given threshold, indicating the mobile communication device should be shut off to avoid spurious operation of the subsystems. Comparator 220 is used to warn the mobile communication device that the battery voltage is approaching a level at which the digital subsystem may be shut down, and comparator 222 may be used to warn the mobile communication device that the battery voltage is approaching a level where the radio frequency subsystem is to be shut down.

Figure 3:
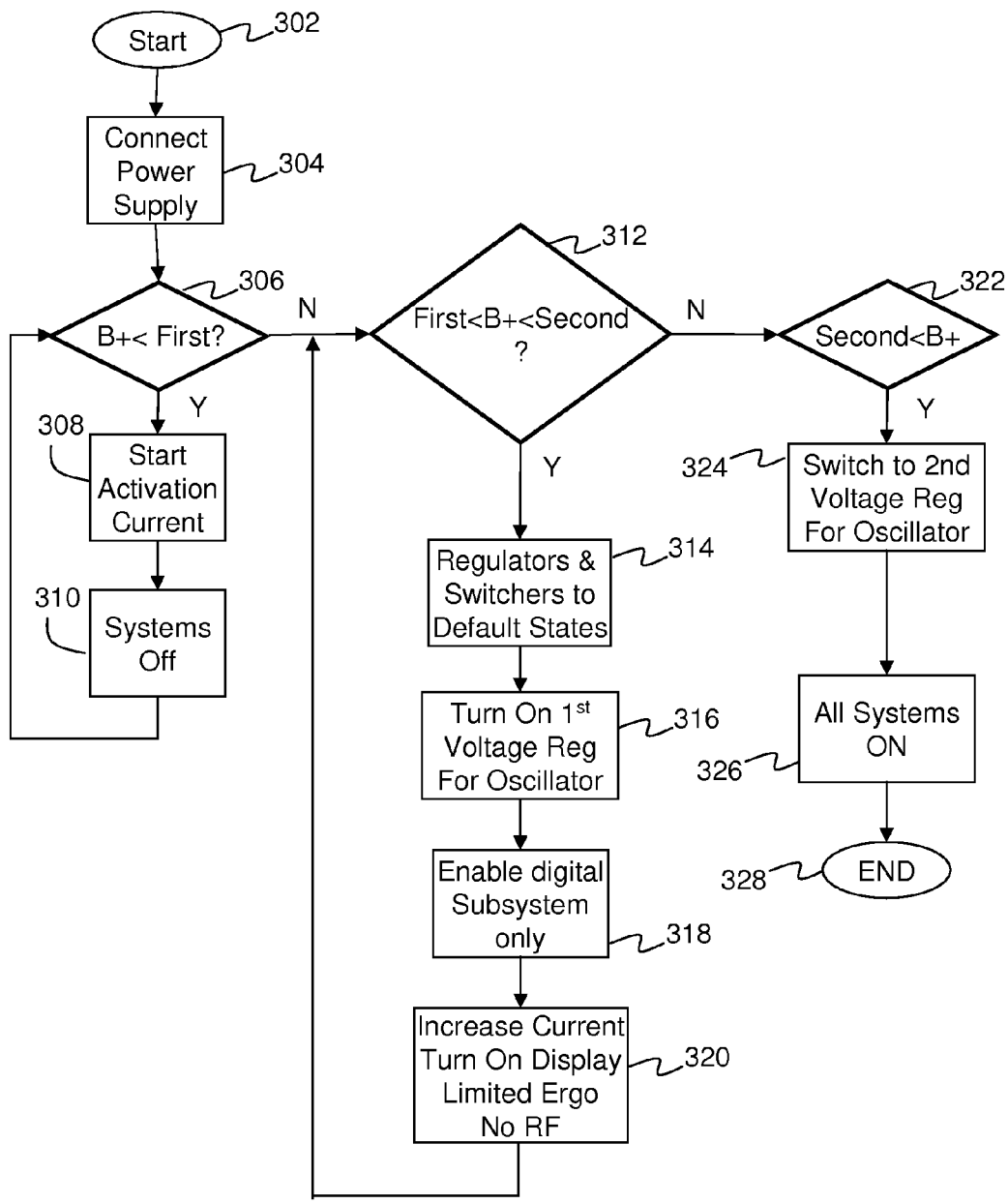
FIG. 3 shows a flow chart diagram of a method of operating a mobile communication device while charging a battery of the mobile communication device, in accordance with an embodiment of the invention.

Referring now to FIG. 3, there is shown a flow chart diagram 300 of a method of operating a mobile communication device while charging a battery of the mobile communication device, such as when the external power supply is disconnected, in accordance with an embodiment of the invention. At the start 302 the battery is in an undetermined state. For illustrative purposes, the mobile communication device is assumed to be turned off. Upon connection of the external power supply 304, the power management circuit must determine the present state of the process, based on the battery voltage. The power management circuit must determine if the battery voltage is presently below a first level 306, such as a digital enable voltage, or between the first level and a second level 312, or if it is above the second level 322. The second level may be, for example, a radio frequency enabling level.

If the present battery voltage is below the first level, the power management IC will allow an activation current to charge the battery 308, while maintaining the digital and radio frequency subsystems off 310 as long as the battery voltage is below the first level. Peripheral components, however, such as the oscillator, may be initialized below the first level. Once the battery voltage rises above the first level and is below the second level, the power management IC may set regulators and switching power supplies to their default states 314, turn on the first voltage regulator for the oscillator 316, enable the digital subsystem 318, and increase the current, if necessary 320. If the battery voltage is presently above the second level, the power control IC may switch the second voltage regulator on to power the oscillator 324, and all systems of the mobile communication device will then be initialized if not enabled. By initialized it is meant that the subsystem has an initial voltage level applied to it, and peripheral and support components of the subsystem are similarly provided with an initial voltage. By enabled it is meant that the subsystem is ready for operation, once the present battery voltage rises to particular level, if necessary. Once the subsystems are all enabled, the methods ends 328. At which point the mobile communication device operates conventionally.

Figure 4:
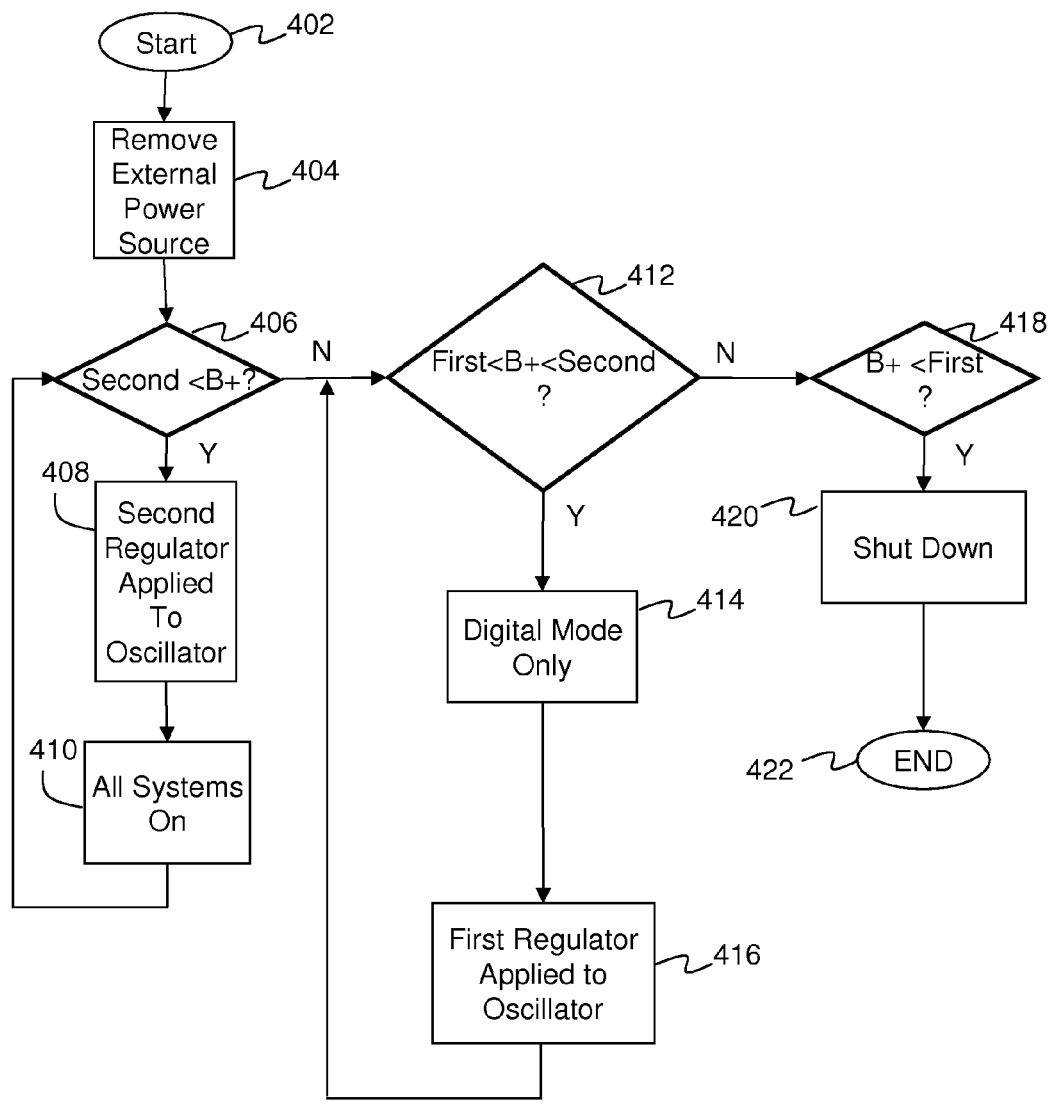
FIG. 4 shows a flow chart diagram of a method of operating a mobile communication device while discharging a battery of the mobile communication device, in accordance with an embodiment of the invention.

Referring now to FIG. 4, there is shown a flow chart diagram 400 of a method of operating a mobile communication device while discharging a battery of the mobile communication device, in accordance with an embodiment of the invention. At the start 402 the mobile communication device may be powered on and operating normally while connected to an external power source. Assume that the battery is fully charged for purposes of illustrating operation of the present method embodiment. Upon removal of the external power source 404, the power control circuit must determine the present battery voltage. There are three ranges of interest; when the battery voltage is above the second level 406, when it has fallen below the second level but is above the first level 412, and when it has fallen below the first level 418.

While the battery voltage is above the second level, the second voltage regulator may be applied to the oscillator 408 and all systems are operational 410. As the battery voltage falls between the second and first levels, the mobile communication device may operate in a digital only mode 414, where the radio frequency subsystem is disabled due to the low level of the battery voltage. Also when the battery voltage is in this range, the first voltage regulator may be applied to the oscillator 416. The first voltage regulator supplies a lower regulated voltage to the oscillator than the second voltage regulator. Finally, when the battery voltage falls below the first level, the mobile communication device shuts down all subsystems 420, and the method terminates.

Thus, the invention provides a mobile communication device which may include a battery having a battery voltage, a charge control circuit for charging the battery from an external power source, a digital subsystem powered by the battery voltage and enabled for operation only while the battery voltage is above a first level, and a radio frequency subsystem powered by the battery voltage and enabled for operation only while the battery voltage is above a second level. The second level being higher than the first level. The digital subsystem may be enabled by a comparator circuit comparing the battery voltage with a reference voltage equal to the first level, and the radio frequency subsystem may be enabled by a comparator circuit comparing the battery voltage with a reference voltage equal to the second level. The mobile communication device may further include an oscillator coupled to, and for providing a clock signal to the digital subsystem and radio frequency subsystem. The oscillator may be powered by a first voltage regulator for supplying a first regulated voltage to the oscillator when the battery voltage is above the first level and below the second level, and a second voltage regulator for supplying a second regulated voltage to the oscillator when the battery voltage is above the second level. The second regulated voltage level being above the first regulated voltage level. The oscillator may be a temperature compensated crystal oscillator. The digital subsystem may operate a user interface for allowing a user to operate the mobile communication device when the battery voltage is above the first level and below the second level, and the digital subsystem is enabled. If the battery voltage is below the first level, the charger circuit may commence charging the battery and continues to charge to the battery to a battery voltage above the second level.

The invention also provides a method of operating a mobile communication device while charging a battery of the mobile communication device, the battery having a battery voltage, commend upon connecting an external power source to the mobile communication device, a power control or charging circuit then commences charging the battery from the external power source. While the battery voltage is below a first level, the digital subsystem and the radio frequency subsystem of the mobile communication device are maintained in an unenabled state. When the battery voltage is above the first level and below a second level, the digital subsystem is enabled, and the radio frequency subsystem remains unenabled. When the battery voltage is above the second level, both the digital and radio frequency subsystems are enabled. The digital and radio frequency subsystems both being powered by the battery voltage. When the battery voltage is above the first level and below the second level, a first regulated voltage may be applied to an oscillator, the oscillator providing a clock signal to the digital and radio frequency subsystems. When the battery voltage is above the second level, a second regulated voltage may be applied to the oscillator. The second regulated voltage level being above the first regulated voltage. The invention may also provide that, when the mobile communication device is initially in an off state, a user input may be received to turn the mobile communication device on. The mobile communication device then provides a user interface operated by the digital subsystem while the battery voltage is between the first and second levels. Once the battery voltage is above the second level, the mobile communication device allows operation of the radio frequency subsystem.

The invention further provides a method of operating a mobile communication device, wherein the mobile communication device is initially coupled to an external power supply for charging the battery, commenced by disconnecting the external power source from the mobile communication device. If the battery voltage is above an upper level, the mobile communication device will maintain both a digital subsystem and a radio frequency subsystem in a powered up state. If the battery voltage falls below the upper level, the mobile communication device maintains the digital subsystem in the powered up state and disables the radio frequency subsystem. If the battery voltage falls below a lower level, the mobile communication device disables both the digital subsystem and radio frequency subsystem.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A mobile communication device, comprising:
    a battery having a battery voltage for powering the mobile communication device;
    a charge control circuit for charging the battery from an external power source;
    a digital subsystem powered by the battery voltage of the battery and enabled for operation only while the battery voltage is above a first level; and
    a radio frequency subsystem powered by the battery voltage of the battery and enabled for operation only while the battery voltage is above a second level;
    wherein the second level is higher than the first level.

2. A mobile communication device as defined in claim 1, wherein the digital subsystem is enabled by a comparator circuit comparing the battery voltage with a reference voltage equal to the first level.

3. A mobile communication device as defined in claim 1, wherein the radio frequency subsystem is enabled by a comparator circuit comparing the battery voltage with a reference voltage equal to the second level.

4. A mobile communication device as defined in claim 1, further comprising an oscillator coupled to the digital subsystem and radio frequency subsystem for providing a clock signal to the digital subsystem and radio frequency subsystem;
    a first voltage regulator for supplying a first regulated voltage to the oscillator when the battery voltage is above the first level and below the second level; and
    a second voltage regulator for supplying a second regulated voltage to the oscillator when the battery voltage is above the second level;

wherein the second regulated voltage level is above the first regulated voltage level.

5. A mobile communication device as defined in claim 4, wherein the oscillator is a temperature compensated crystal oscillator.

6. A mobile communication device as defined in claim 1, wherein the digital subsystem operates a user interface for allowing a user to operate the mobile communication device when the battery voltage is above the first level and below the second level.

7. A mobile communication device as defined in claim 1, wherein, if the battery voltage is below the first level, the charger circuit commences charging the battery and continues to charge to the battery to a battery voltage above the second level.

8. A method of operating a mobile communication device while charging a battery of the mobile communication device, the battery having a battery voltage, comprising:
    connecting an external power source to the mobile communication device;
    charging the battery from the external power;
    while the battery voltage is below a first level, maintaining a digital subsystem and a radio frequency subsystem of the mobile communication device in an unenabled state;
    while the battery voltage is above the first level and below a second level, enabling the digital subsystem and maintaining the radio frequency subsystem in the unenabled state while charging the battery of the mobile communication device; and
    while the battery voltage is above the second level enabling both the digital and radio frequency subsystems while charging the battery of the mobile communication device;
    wherein the digital and radio frequency subsystems are both powered by the battery voltage.

9. A method of operating a mobile communication device as defined in claim 8, further comprising:
    while the battery voltage is above the first level and below the second level, applying a first regulated voltage to an oscillator providing a clock signal to the digital and radio frequency subsystems; and
    while the battery voltage is above the second level, applying a second regulated voltage to the oscillator;
    wherein the second regulated voltage level is above the first regulated voltage.

10. A method of operating a mobile communication device as defined in claim 9, wherein the oscillator is a temperature compensated crystal oscillator.

11. A method of operating a mobile communication device as defined in claim 8, wherein the mobile communication device is initially in an off state, the method further comprising:
    receiving a user input to turn the mobile communication device on;
    providing a user interface by the digital subsystem while the battery voltage is between the first and second levels; and
    allowing operation of the radio frequency subsystem when the battery voltage is above the second level.

12. A method of operating a mobile communication device having a battery, the battery having a battery voltage, an external power supply initially coupled to the mobile communication device for charging the battery, the method comprising:
    disconnecting the external power source from the mobile communication device;
    if the battery voltage is above an upper level, maintaining both a digital subsystem in a powered up state and a radio frequency subsystem in a powered up state;
    if the battery voltage falls below the upper level, maintaining the digital subsystem in the powered up state and disabling the radio frequency subsystem;
    if the battery voltage falls below a lower level, disabling both the digital subsystem and radio frequency subsystem;
    while the battery voltage is above upper level, applying an upper regulated voltage to an oscillator providing a clock signal to the digital and radio frequency subsystems; and
    while the battery voltage is below the upper level, applying a lower regulated voltage to the oscillator.

13. A method of operating a mobile communication device as defined in claim 12, wherein the oscillator is a temperature compensated crystal oscillator.

14. A method of operating a mobile communication device as defined in claim 12, wherein when the battery voltage is between the upper and lower levels, the method further comprising maintaining a user interface provided by the digital subsystem.

15. A method of operating a mobile communication device as defined in claim 12, further comprising shutting off the digital subsystem if the battery voltage falls below the lower level.

* * * * *